United States Patent [19]

Ross et al.

[11] Patent Number: 5,530,419
[45] Date of Patent: Jun. 25, 1996

[54] AMBIENT PRESSURE CONTROLLED AUTOMOBILE ALARM

[76] Inventors: George Ross; Ping Lee, both of 14044 Ventura Blvd., Sherman Oaks, Calif. 91433

[21] Appl. No.: 485,279

[22] Filed: Jun. 7, 1995

Related U.S. Application Data

[63] Continuation of Ser. No. 95,574, Jul. 19, 1993, abandoned.

[51] Int. Cl.$^6$ .................................................. G08B 13/16
[52] U.S. Cl. ........................... 340/426; 340/566; 340/550
[58] Field of Search .................................. 340/544, 530, 340/556, 522, 426, 425.5, 541, 566

[56] References Cited

U.S. PATENT DOCUMENTS

| | | | |
|---|---|---|---|
| 4,241,338 | 12/1980 | Spirig | 340/566 |
| 4,991,145 | 2/1991 | Goldstein et al. | 367/94 |
| 5,185,543 | 2/1993 | Purand, III et al. | 340/544 |

Primary Examiner—Victor R. Kostak
Assistant Examiner—Nathan J. Flynn
Attorney, Agent, or Firm—Julius Rubinstein

[57] ABSTRACT

An automobile anti-theft alarm has an internal air pressure sensor and an external pressure sensor and a connecting electric circuit. The internal pressure sensor is mounted inside the compartment of the automobile and is connected through the electric circuit to an alarm in such a way that when the internal pressure sensor detects a pressure change the alarm will sound. The external pressure sensor is mounted outside the compartment of the automobile. Air pressure fluctuations originating outside the vehicle compartment are transmitted by the flexure of the vehicle body into the vehicle. The electric circuit is connected to an alarm and to both the inner and external pressure sensors in such a way that external air pressure fluctuations affect both sensors and the outer pressure sensor produces a voltage in the electric circuit which prevents the alarm from being activated.

3 Claims, 2 Drawing Sheets

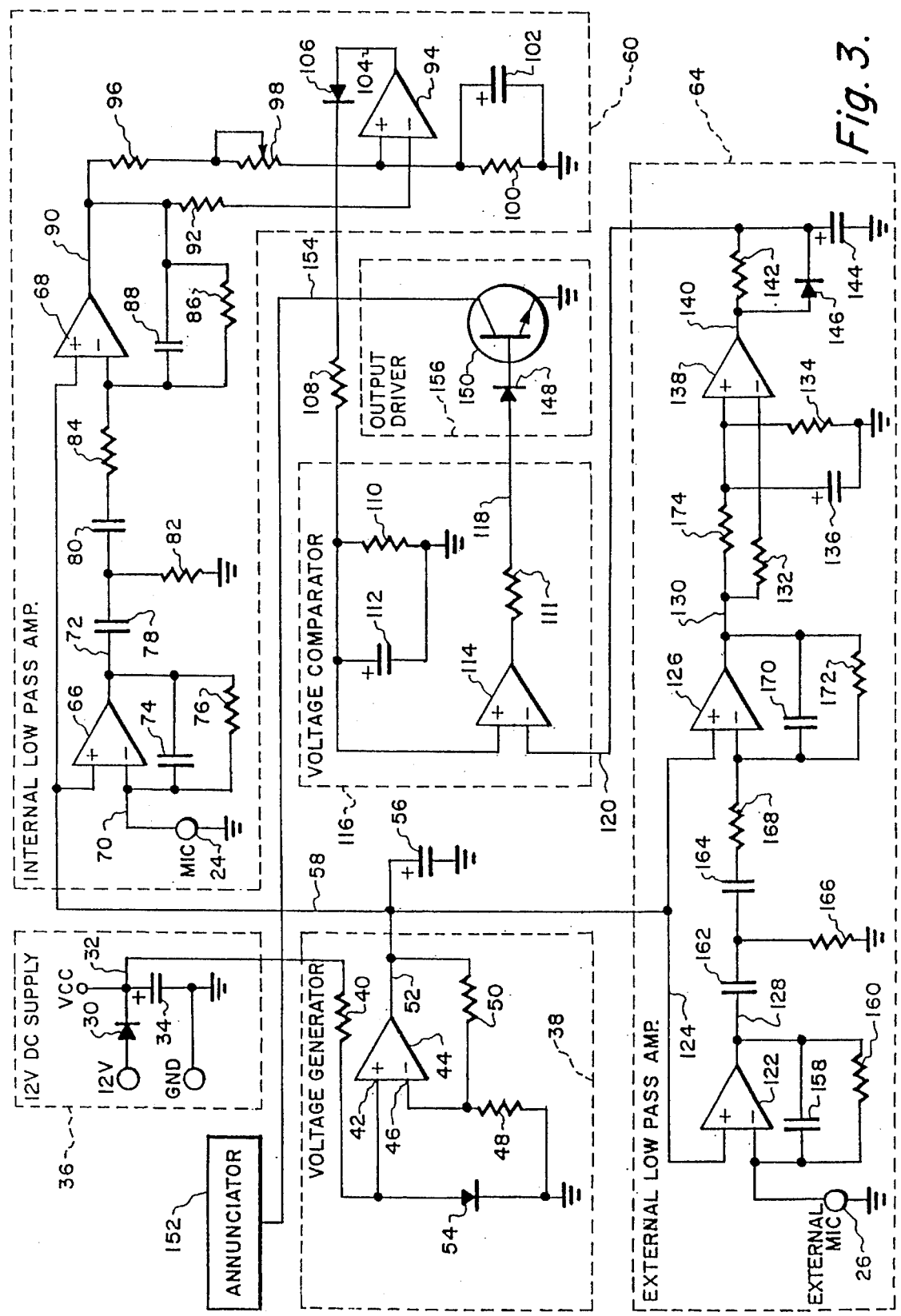

AMBIENT PRESSURE CONTROLLED AUTOMOBILE ALARM

This is a Continuation of patent application Ser. No. 08,095,574 filed Jul. 19, 1993 now abandoned.

This invention relates to a car alarm having means for using ambient pressure changes for preventing false alarms.

FEDERALLY SPONSORED RESEARCH

No part of this patent application was developed with the aid of any federally sponsored research and development.

DESCRIPTION OF PRIOR ART

Alarm systems for cars, museum rooms, and the like, are well known. They generally use a detector of some sort placed in the space being protected which is connected to the vehicle alarm. These alarm systems depending on their design, are sensitive to sound, temperature, light, motion, air pressure, etc. As a result, the prior art alarm systems were often erroneously or accidentally activated by phenomenon occurring outside the protected space.

SUMMARY OF INVENTION

Alarm systems using air pressure sensors mounted in the vehicle compartment have some advantages because they eliminate the effect of external noise. But they cause other problems because of the frequency of false alarms. Applicants discovered that ambient air pressure fluctuations occurring outside the vehicle are transmitted into the vehicle compartment, because of minute flexures in the vehicle body which respond to ambient air pressure changes. This would cause frequent false alarms, if a pressure sensor is mounted inside the vehicle compartment. To prevent this from happening, Applicants designed a vehicle alarm system in such a way that the alarm does not respond to ambient air pressure changes around the vehicle, but instead responds only changes in air pressure inside the vehicle. To do this, an inner pressure sensor with a high degree of sensitivity connected to the vehicle alarm is mounted inside the vehicle compartment as described above and an outer pressure sensor also with a high degree of sensitivity is mounted outside the vehicle compartment in a location where it responds to ambient air pressure changes, such as in the engine compartment. The outer pressure sensor is connected to the inner pressure sensor by an electric circuit. The electric circuit is designed so when the ambient air pressure changes, it affects both the inner and outer pressure sensors alike. This inner pressure sensor is very sensitive, and since it is connected to the vehicle alarm, its response would normally activate the alarm. However, as stated above, the ambient air pressure change also affects the outer pressure sensor, and as will be described below, this prevents the alarm from being activated thereby eliminating false alarms due to ambient air pressure changes.

The internal and external pressure sensors are connected to the electric circuit with the inner pressure sensor connected to the alarm. In this way the inner pressure sensor reacts to pressure changes occurring inside the vehicle compartment which may be caused by ambient pressure changes or by an intruder. Either way this could trigger an alarm, and if the alarm were caused by an ambient pressure change it would be a false alarm.

To prevent this from happening, the sensor outside the vehicle which is positioned so it responds to ambient air pressure changes, affects another part of the electric circuit, in such a way that when the outer pressure sensor responds to an ambient pressure change, it prevents the inner pressure sensor from activating the alarm, thereby preventing a false alarm.

With this arrangement any unauthorized entry into the vehicle compartment which affects the inner pressure sensor, but not the outer pressure sensor, which could be caused by opening the door of the vehicle, or any kind of forced entry, turns on the alarm. But loud external noises, occurring at an airport, or caused by an automobile backfire, or noises from a dog or children left inside the vehicle compartment will not disturb the air pressure inside the vehicle compartment enough to trigger the alarm, thereby preventing an erroneous alarm activation. However even a silent lifting of the vehicle trunk lid, in the case of an automobile, will disturb the air pressure inside the vehicle sufficiently to activate the alarm. With this type of an alarm system any car with a trunk, carrying valuables, such as jewelry in the trunk could be protected. Consequently, when the driver of a vehicle leaves it, he knows when the someone has entered the vehicle compartment or opened its trunk.

What is needed therefore and comprises an important part of the invention is to provide a vehicle alarm having a sensitive pressure sensor mounted inside the compartment of the vehicle connected to an alarm in such a way that it is not affected by ambient air pressure changes ocurring outside the vehicle compartment.

Another object of this invention is to provide a vehicle alarm which responds to any unauthorized entry into the vehicle.

These and other objects of this invention will become more apparent when better understood in the light of the specification and accompanying drawings wherein:

FIG. 3 is an electrical schematic view of the block of the alarm circuit of FIG. 2.

As described above, when a vehicle with this alarm system mounted thereon, is parked in an open space, the alarm system will not be activated by pressure changes which constantly occur. However to illustrate the sensitivity of this alarm system, and by way of illustration to show its practical use, the vehicle being protected is shown parked in a garage. Since people go in and out of a garage frequently the alarm system although "on" must not be activated erroneously.

Figure 1:
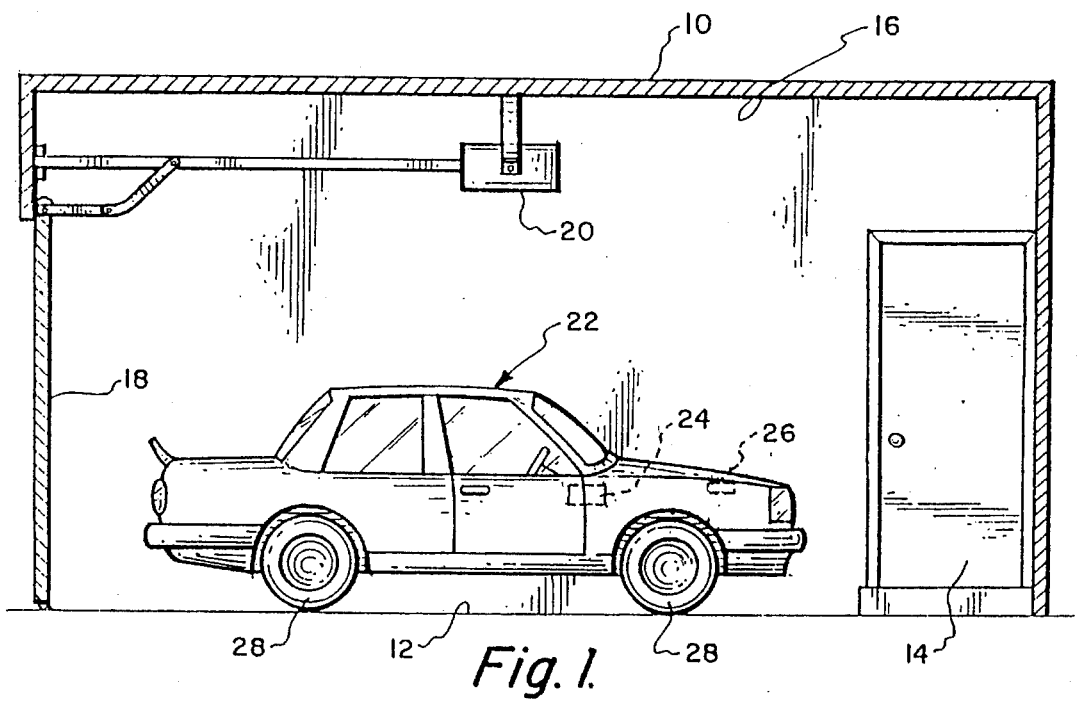
FIG. 1 is a diagrammatic view of a typical automobile with the vehicle alarm showing the automobile being parked within a garage.
Figure 2:
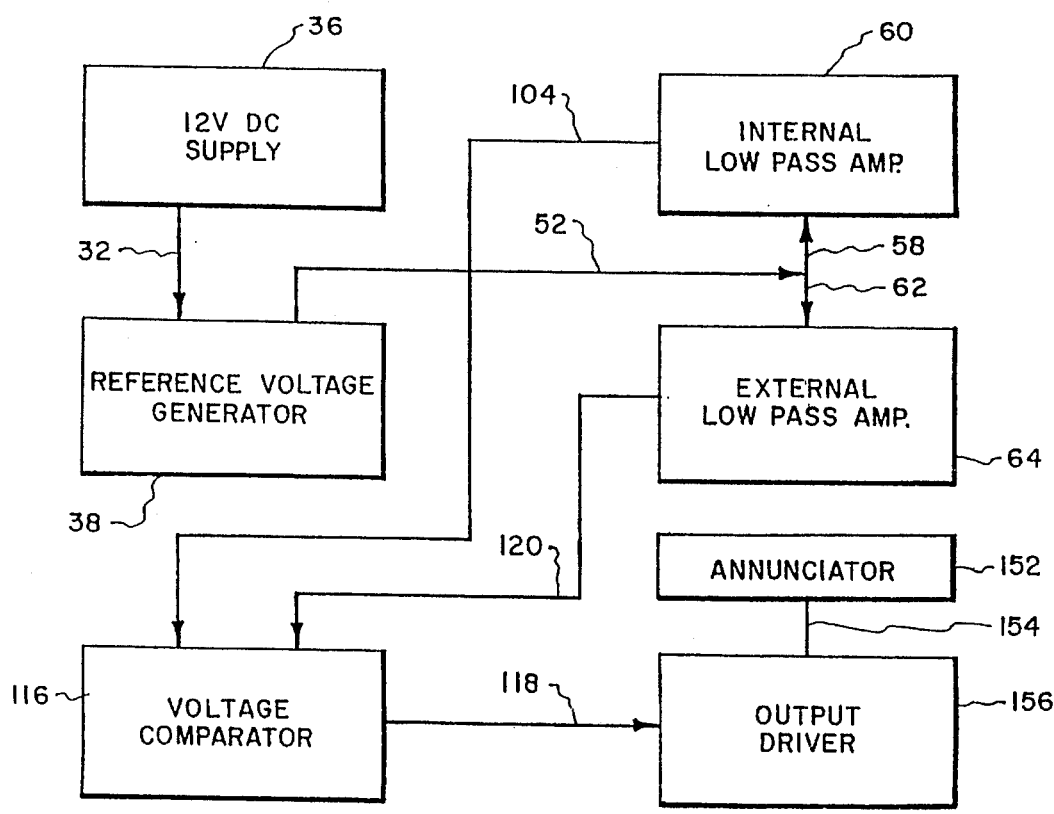
FIG. 2 is a block diagram of the circuit of the alarm of the present invention.

Referring particularly to the drawings, there is depicted in FIG. 1, in longitudinal cross section a typical garage 10 which has a floor 12. Garage 10 will normally be mounted in conjunction with a house (not shown) with an access door 14 being provided between the internal enclosure 16 of the garage 10 and the house. The internal enclosure 16 can be closed by garage door 18 which may be done remotely by a garage door opening mechanism 20. An automobile 22 is located within the enclosure 16 resting on the floor 12. The automobile 22 includes a passenger compartment 23. Mounted within this passenger compartment is an internal pressure sensor 24 and an external pressure sensor 26, which is, in this particular embodiment, mounted in the engine compartment. These pressure sensors are connected together by an electric circuit 27, see FIG. 3.

The electric circuit is powered by the vehicle battery which is connected to the circuit 27 through diode 30 and on into conductor 32. The conductor 32 is connected to ground through capacitor 34. The purpose of the capacitor 34 is to hold the voltage within the conductor 32 to twelve volts so that even in instances where there is an excessive drain on the battery of the automobile 22, the voltage within the line 32 will be prevented from going below twelve volts. Diode 30 and capacitor 34 are a part of a 12 volt DC supply 36.

The conductor 32 connects to a reference voltage generator 38. The signal from conductor 32 is conducted through resistor 40 and to the positive terminal 42 of amplifier 64. The resistor 40 functions as a current limiting resistor to the diode 54. Diode 54 connects between the conductor 32 and the electrical ground. About 0.6 volts is being supplied to the positive terminal 42. The negative terminal 46 of the amplifier 44 is connected with resistors 48 and 50 through the output conductor 52 of the amplifier 44. The purpose of the capacitor 56 is to maintain the output reference voltage within the conductor 52 to be one volt.

The output reference voltage is supplied from conductor 52 into conductor 58, into an internal low-pass amplifier 60 and into conductor 62 to an external low-pass amplifier 64. The internal and external low pass amplifiers are used to amplify ambient air pressure changes. The reference voltage on conductor 58 is supplied to the positive terminal of both amplifiers 66 and 68. The output of the internal pressure sensor 24 is connected through conductor 70 to the negative input of amplifier 66, and the output conductor 72 of the amplifier 66 is connected to appropriate gain circuitry in the form of capacitor 74 and resistor 76. The output signal within conductor 72 will again be approximately one volt with the signal in conductor 72 being conducted through a low-pass filter formed by capacitors 78 and 80 and resistor 82 to the negative terminal of amplifier 68. Because of capacitor 72 only AC voltage passes through resistor 84 which in conjunction with resistor 86 and capacitor 88 sets the gain for the second stage amplifier 68. As a result the output of amplifier 68 produces a signal in the range of five to ten volts on conductor 90.

The output voltage from the conductor 90 is conducted through an input resistor 92 to the negative terminal of an amplifier 94. The signal from conductor 90 is also conducted to a fixed value resistor 96 and variable resistor 98 which functions as a potentiometer. From the potentiometer 98 the signal is conducted into the positive side of the amplifier 94. The resistor 100 and the capacitor 102 functions to hold the charge being supplied into the positive terminal of the amplifier 94 for a brief period of time such as one or two seconds. Also the capacitor 102 and the resistor 100 works as a noise filter.

The output of the amplifier 94 is conducted through conductor 104, to diode 106 and fixed value resistor 108 which cooperates in conjunction with resistor 110 and capacitor 112 to again hold the charge for a brief time. This charge is supplied to the positive terminal 115 of amplifier 114 of a voltage comparator 116. The amplifier 114 will only produce an output signal within the conductor 118 if the positive terminal of the amplifier 114 is higher than the voltage on the negative terminal 117 of the amplifier 114. The negative terminal 117 is connected to conductor 120. The signal within the conductor 120 is responsive to the external or second microphone 26 which is included within the external low pass amplifier circuit 64.

If a pressure change is detected by pressure sensor 26, a voltage is supplied to the negative terminal of amplifier 122. The positive terminal of amplifier 122 is connected through conductors 124 and 58 to the internal low pass amplifier 60. Conductor 124 is also connected to positive terminal of the second stage amplifier 126. If a pressure change is detected by the pressure sensor 26, a voltage is transmitted to the negative terminal of amplifier 122 which has a voltage on its positive terminal. The circuit is designed so when a voltage supplied to both the positive and negative terminals of amplifier 122, there is no output voltage on conductor 128. Conductor 128 is also connected to the negative terminal of amplifier 126. But the circuit 27 is designed so amplifier 126 has a voltage on its positive terminal. With this arrangement, the voltage on the positive input terminal of amplifier 126 will be greater than the voltage on the negative terminal so amplifier 126 will have an output voltage on conductor 130. The voltage on conductor 130 is held for a period of time by means of resistor 132, resistor 134, and capacitor 136. The resistors 132 and 134 are connected to the negative input terminal of an amplifier 138 and as shown in the circuit diagram are grounded so that the negative terminal of amplifier 138 has no voltage. But the voltage on conductor 130 is connected to the positive terminal of amplifier 138 so the amplifier 138 has an output voltage on conductor 140. The resistor 142 and capacitor 144 holds the voltage for a brief period of time in the conductor 120 which is connected to the negative input terminal of control amplifier 114.

The diode 146 instantly charges capacitor 144 to prevent any time delay to the voltage being conducted through resistor 142. Since conductor 120 leads to the negative input terminal 117 of control amplifier 114, the voltage on the input terminal is higher than the voltage on the positive terminal of amplifier 114 so amplifier 114 has no output voltage. The electric circuit is designed so as long as the positive and negative terminals of amplifier 114 have a voltage the amplifier 114 has no output voltage. Amplifier 114 only has an output voltage when the voltage on the positive input terminal 115 is higher than the voltage on the negative input terminal 117. This occurs when the inner pressure sensor 24 detects a pressure change and the outer pressure sensor does not.

When the amplifier control 114 has an output voltage, the transistor 150, which is connected to the alarm is actuated and its output voltage activates the alarm 152. If the control amplifier 114 has no output voltage, which occurs when there is a voltage on the negative terminal caused by external pressure changes, the alarm is not activated. In this way amplifier 114 functions as a switch to activate the alarm 152 on only when there is the voltage on the positive input terminal.

If there is an unauthorized entry into the vehicle compartment, the inner pressure sensor 24 will detect a pressure change causing the voltage on the positive terminal to rise, but under these circumstances the pressure change occurs only inside the vehicle compartment. Therefore the outer pressure sensor 26 will not detect a pressure change so that there is no voltage on the negative terminal 117 of the amplifier 122. Consequently the alarm 152 is actuated. As stated above the circuit is designed so when an external pressure change is detected by both the inner and outer sensors, the alarm is not activated.

With this arrangement, even when a vehicle is parked in a garage, any entry into the garage by anyone will cause an external pressure disturbance which will be detected by both the inner and outer sensors so that a false alarm is not sounded.

Having described the invention, what we claim as new is:

1. An alarm system comprising in combination a motor vehicle, said motor vehicle having a body of the type which flexes in response to ambient air pressure fluctuations, said vehicle body surrounding a vehicle compartment whereby the vehicle body transmits ambient air pressure changes to the interior of the compartment, an alarm, an inner pressure sensor mounted in said compartment and connected to said alarm, a control circuit, said control circuit including a control amplifier, said control amplifier having input terminals and an output terminal, said output terminal connected to said alarm and triggering said alarm when a voltage appears on said output terminel, said inner pressure sensor connected to a one input of said control amplifier, an outer pressure sensor mounted outside said vehicle compartment where it can respond to ambient pressure changes, said outer pressure sensor connected to a another input terminal of said control amplifier, said control circuit connected to said control amplifier in such a way that the control amplifier produces an alarm triggering voltage on its output terminal only when the voltage on the first input terminal is greater than the voltage the second input terminal, whereby pressure changes or movement originating inside the vehicle compartment have no affect on the alarm system, while pressure changes inside the compartment caused when an intruder unlawfully attempts to enter the vehicle compartment affects only the inner pressure sensor and not the outer pressure sensor, and triggers the alarm.

2. An alarm system comprising in combination a motor vehicle, said motor vehicle having a vehicle body of the type which flexes in response to ambient air pressure fluctuations, a vehicle compartment said vehicle body surrounding said vehicle compartment whereby the flexure of the vehicle body transmits ambient air pressure changes to the interior of the vehicle compartment, an alarm, an inner pressure sensor mounted in said compartment, inner pressure sensor amplifying means having an input and an output, said inner pressure sensor connected to the input of said inner pressure sensor amplifying means, alarm control means having input terminals and an output terminal, means connecting the output of said inner pressure sensor amplifying means to ode input terminal of said alarm control means, an outer pressure sensor mounted outside said compartment in a position where it can respond to ambient pressure changes, outer pressure sensor amplifying means having an input and an output, said outer pressure sensor connected to the input of said outer pressure sensor amplifying means, the output of said outer pressure sensor amplifying means connected to another input terminal of said alarm control means, the input terminals of said alarm control means connected to the output terminal of said alarm control means in such a way that an output voltage from said inner pressure sensor amplifying means onto an input terminal of said alarm control means caused by an unauthorized entry into the compartment which is greater than the voltage on the other input terminal of said alarm control means caused by ambient air pressure fluctuations onto the said other input terminal of said alarm control means produces an output voltage on the output terminal of said alarm control means thereby triggering an alarm, while voltages from ambient pressure fluctuations appearing on both input terminals of said alarm control meansand thereby interferes with the alarm in a way that prevents the said alarm from operating whereby false alarms from ambient pressure changes occurring outside said compartment is prevented.

3. The alarm system described in claim 2 wherein said alarm control means comprises a control amplifier, said control amplifier having positive and negative input terminals and an output terminal, voltage amplifying means connecting said control amplifier output terminal to said alarm, said control amplifier being of the kind that has an output voltage on its output terminal when the voltage on the positive input terminal of the control amplifier is greater than the voltage on the negative input terminal whereby voltage on said control amplifier output terminal is amplified by said voltage amplifying means and actuates said alarm when the pressure changs caused by an intruder entering said compartment is greater than the voltage on said control amplifier caused by the ambient pressure affecting said outside sensor, while noise or movement originating inside said compartment has no affect on pressure changes inside said compartment, thereby preventing false alarms from movement inside said compartment.

\* \* \* \* \*

UNITED STATES PATENT AND TRADEMARK OFFICE
CERTIFICATE OF CORRECTION

PATENT NO. : 5,530,419

DATED : June 25, 1996

INVENTOR(S) : George Ross, et. al.

It is certified that error appears in the above-indentified patent and that said Letters Patent is hereby corrected as shown below:

Column 5, claim 2, line 37, the word "ode" should be--one--.

Column 6, claim 2, line 17, the words "meansand thereby" should be--means--.

Signed and Sealed this

Twenty-sixth Day of November 1996

Attest:

BRUCE LEHMAN

*Attesting Officer*    *Commissioner of Patents and Trademarks*